(12) United States Patent
Rocca-Serra (10) Patent No.: US 10,935,092 B2
(45) Date of Patent: Mar. 2, 2021

(54) BRAKE PAD AND BRAKING UNIT FOR CAPTURING PARTICLES

(71) Applicant: TALLANO TECHNOLOGIE, Boulogne Billancourt (FR)

(72) Inventor: Christophe Rocca-Serra, Paris (FR)

(73) Assignee: TALLANO TECHNOLOGIE, Boulogne (FR)

( * ) Notice: Subject to any disclaimer, the term of this patent is extended or adjusted under 35 U.S.C. 154(b) by 59 days.

(21) Appl. No.: 16/339,739

(22) PCT Filed: Oct. 5, 2017

(86) PCT No.: PCT/EP2017/075401
§ 371 (c)(1),
(2) Date: Apr. 5, 2019

(87) PCT Pub. No.: WO2018/065541
PCT Pub. Date: Apr. 12, 2018

(65) Prior Publication Data
US 2020/0049213 A1 Feb. 13, 2020

(30) Foreign Application Priority Data
Oct. 5, 2016 (FR) ..................................... 1659613

(51) Int. Cl.
*F16D 65/00* (2006.01)
*F16D 55/22* (2006.01)
(Continued)

(52) U.S. Cl.
CPC ......... *F16D 65/0031* (2013.01); *F16D 55/22* (2013.01); *F16D 65/092* (2013.01);
(Continued)

(58) Field of Classification Search
CPC ............. F16D 65/0031; F16D 65/0037; F16D 2069/004; F16D 55/22; B60T 5/00
See application file for complete search history.

(56) References Cited

U.S. PATENT DOCUMENTS 3,190,397 A * 6/1965 Sudres ................ F16D 69/0408
188/1.11 R
4,135,606 A * 1/1979 Lewis ..................... B62L 1/005
188/24.12
(Continued)

FOREIGN PATENT DOCUMENTS

DE 4401846 A1 * 7/1995 ........... F16D 65/092
DE 198 46 887 4/2000
(Continued)

OTHER PUBLICATIONS

International Search Report, PCT/EP2017/075401, dated Dec. 21, 2017.

Primary Examiner — Thomas J Williams
(74) Attorney, Agent, or Firm — Nixon & Vanderhye (57) ABSTRACT

Brake pad in an axle disc brake A, the pad comprising a shoe (1) and a lining made from friction material, the lining being defined by a friction face (26), a mounting face (20), an internal edge (23), an external edge (24), a front edge (21), a rear edge (22), the lining being provided with a collection groove (3), open on the friction face (26) and arranged close to the front edge (21), the shoe comprising a hole (17) in fluid communication with the collection groove, this hole being connected to a vacuum source via the communication means (4), the collection groove emerging at one of the edges chosen among the internal and external edges.

20 Claims, 6 Drawing Sheets

(51) Int. Cl.
*F16D 65/092* (2006.01)
*F16D 69/00* (2006.01)

(52) U.S. Cl.
CPC .... *F16D 65/0037* (2013.01); *F16D 2069/004* (2013.01); *F16D 2200/0004* (2013.01)

(56) References Cited

U.S. PATENT DOCUMENTS

| | | | |
|---|---|---|---|
| 4,315,563 A * | 2/1982 | Hayashi | F16D 65/0006 188/250 G |
| 2014/0116824 A1 | 5/2014 | Jakubowski et al. | |
| 2015/0001013 A1 * | 1/2015 | Mennie | F16D 65/092 188/73.1 |
| 2020/0149601 A1 * | 5/2020 | Rocca-Serra | F16D 65/092 |

FOREIGN PATENT DOCUMENTS

| | | | | |
|---|---|---|---|---|
| DE | 19846887 A1 * | 4/2000 | | F16D 65/0031 |
| EP | 2 725 255 | 4/2014 | | |
| FR | 3034831 A1 * | 10/2016 | | B60T 5/00 |
| FR | 3054627 A1 * | 2/2018 | | F16D 65/847 |
| FR | 3071573 A1 * | 3/2019 | | F16D 65/0031 |
| FR | 3076877 A1 * | 7/2019 | | F16D 65/092 |
| GB | 2 533 476 | 6/2016 | | |
| JP | 56017428 U * | 2/1981 | | F16D 65/00 |
| JP | 2007-192268 | 8/2007 | | |
| WO | WO 2014/072234 | 5/2014 | | |

\* cited by examiner

BRAKE PAD AND BRAKING UNIT FOR CAPTURING PARTICLES

TECHNICAL FIELD

This invention relates to non-polluting brake systems, intended in particular to be used on road or rail vehicles. The invention, in particular, relates to braking systems able to capture by suction, particles and dust resulting from abrasion, emitted by the friction braking.

It is known that these particles dispersed in the surrounding environment are harmful to the health of individuals. The development of electrical engines for automotive vehicles has heightened the need to process particles and dust resulting from abrasion, from friction braking systems.

PRIOR ART

The document WO2014072234 discloses a simple and autonomous device, based on the principle of suction as close as possible to the pad/disc interface.

However, it has proved to be that the capture rate is not optimum, as this depends on air conditions and, in particular, the relative wind, which is prevalent at the immediate surroundings of the brake pad.

A need has therefore appeared to improve solutions to capture particles and dust resulting from braking effectively, in view of removing all or part of the aforementioned disadvantages.

SUMMARY OF THE INVENTION

To this end, according to this invention, a brake pad in an axle disc brake A is proposed, the pad comprising a shoe, and a friction material lining, the lining being delimited by a friction face, a mounting face, an external edge, a front edge, a rear edge, the lining being provided with a collection groove, open on the friction face and arranged close to the front edge, the shoe comprising a fluid communication hole with the collection groove, this hole being connected to a vacuum source via the communication means, characterised in that the collection groove emerges at one of the edges chosen among the internal and external edges.

Using these provisions, it is possible to increase the rate for capturing particles in various air conditions around the brake unit.

Indeed, more specifically, it is noted that particles are captured before they exit the interface between the pad and the disc.

By a simple suction method without blowing, the system can capture most of the particles which escape from the lining.

Furthermore, the presence of this groove does not substantially decrease the braking effectiveness for a given total available friction contact surface area.

Furthermore, the cooling performances of the pad and the surrounding components are not impeded by the presence of an additional component near the pad, as known in the prior art.

In various embodiments of the invention, one/both of the following provisions can possibly be resorted to:
the collection groove can be hollowed directly in the friction material, up to the surface area of the shoe. This groove can be formed by a very common machining operation;
the collection groove can be formed directly in the friction material during the sintering operation, with a groove bottom which corresponds to the shoe surface area; a moulding insert is used to obtain the groove cavity precisely, at the same time as the lining itself is formed;
The shoe is preferably made from a metal material, formed like a constant full thickness pad with one or two holes, of which one will be used as a passage for the suction of particles removed at the lining;
Advantageously, the surface area S3 occupied by the groove, is less than 5% of the total available surface area S20 on the friction face, and again, it is more preferred to be less than 4%; an optimised braking effectiveness is obtained for the available surface area, while collecting particles.
the collection groove extends generally radially in relation to the axle A, between an open end and a blind end, the shoe hole emerging at the groove close to the blind end. Thus, the pneumatic/aeraulic path is optimised.
According to an option, the collection groove is unique and continuous, and the collection groove is of a constant width and is substantially parallel to the front edge of the lining; the inventors have discovered that this position was optimal to maximise the collection of particles and keep a good level of braking effectiveness;
According to an option, the width of the collection groove can be between 1.5 mm and 4 mm, preferably near 2.5 mm; which is optimum for light-duty or medium-duty automotive vehicles;
According to an option, the width of the collection groove can go from 2.5 mm up to 6 mm; which is an optimum for heavy goods vehicles or buses, or again rail stock; According to another aspect, the invention aims for a braking unit comprising a brake disc, a brake calliper, two pads such as previously defined and a suction device, pneumatically connected to the grooves of the pads by the communication means.
According to an option, the communication means comprise at least one flexible hose; thus, the flexible hose can follow the pad in its movements, in particular as the lining has wear and tear; and this facilitates assembly during the replacement of pads;
According to an option, an end of the flexible hose is fitted into a shoe hole; thus, the hose and the pad can be selectively coupled, in particular during the operation of replacing pads;
According to an option, the communication means are formed through an internal passage arranged in the body of the calliper; this forms a smart solution in the event where the body of the calliper is solid;
According to an option, the suction device is arranged close to the brake calliper, with the communication means connecting the shoe holes to the suction device; thus, the capture and the storage are achieved locally, close to the collection of particles.
According to another option, the suction device can be arranged remotely and serve as a resource, common to several braking bodies,
the means for driving the suction device can be controlled electrically by a control unit; thus, the suction phases can be controlled according to a predefined logic, in particular according to the different braking phases.

BRIEF DESCRIPTION OF THE DRAWINGS

Other aspects, aims and advantages of the invention will appear upon reading the following description of two of its embodiments of the invention, given as non-exhaustive examples. The invention will also be best understood regarding the attached drawings, whereon.

DETAILED DESCRIPTION OF THE INVENTION

In the different figures, the same references mean identical or similar elements. It must be noted that the drawings are not necessarily to scale, certain dimensions have been exaggerated to make the presentation clear, in particular certain safety gaps or clearances.

This invention relates to a disc brake configuration. Such a disc brake configuration is very common in automobiles, commercial vehicles, heavy goods vehicles, buses, as well as in rail rolling stock, and also on two-wheelers. In this configuration, the braking action is operated on a rotor called a 'disc', connected to the wheel rim, but separate from it. As it is well known, two brake pads 10, such as those illustrated in FIGS. 1 to 4, are arranged on both sides of the disc, opposite the lateral faces of the disc. A pressure is selectively exerted, according to a braking control, extending to move the pads closer to each other, and to press against the faces of the disc, in other words, the pads sandwich the disc.

More and more particles become emitted by the braking systems, because of the increase in vehicle traffic, in particular in urban areas. Medical studies confirm the damage from these particles for individuals' respiratory systems, and for health in general. Therefore, it seems important to highly reduce the emission of these particles in the surrounding environment, which is what this invention relates to.

Even if frictionless braking systems are endeavoured to be used, when possible, like a regenerative electrical braking system or a Foucault current system, it is proved to be that these systems cannot be moved to from friction braking systems, as they effective at all speeds, and they enable the vehicle to be kept off, and supply an adequate and effective solution if there is a need for emergency braking.

As regards a friction braking system, this is therefore based on a rotor 9 (here a disc) turning around a wheel axle A, whereon two runners act through friction to decrease its speed, by transforming the kinetic energy into heat. The braking body 19 further comprises two runners, a calliper 5 fitted with a piston 55 and a calliper support 6.

The rotation around the axle A enables to define a tangential (or circumferential) direction T and a radial direction R (locally orthogonal to the axle A and to the tangential direction T).

Also, a standard rotational direction FW is defined, which corresponds to the forward motion. For the case of a road vehicle, generally 99% of braking particles are emitted when the vehicle brakes, by being moved forward. Indeed, in backward motion, the vehicle hardly brakes.

As illustrated in FIGS. 1 to 4, a brake pad comprises a shoe 1, also sometimes called a metal baseplate. The shoe is preferably made from metal material; it is formed like a constant full thickness pad (between 3 and 5 mm typically). Its general facial form is rectangular, sometimes with a curve which follows the curve of the lateral face of the disc, whereon the pads will come to exert their force.

The shoe 1 comprises an external face 14 intended to support the calliper and/or the piston 55 of the axle A2 and an internal face 13, whereon the lining is attached.

The brake pad also comprises a support body, also called a "brake lining" 2 comprising friction material, this material sometimes commonly called "Ferodo". The lining 2 is likely to release particles 28 resulting from abrasion due to friction.

The lining 2 is delimited by a friction face 26 ('rubbing' face), a mounting face 20 opposite the friction face and jointly attached to the shoe, an internal edge 23 (side of the axle A), an external edge 24 (on the opposite side of the axle A), a front edge 21 and a rear edge 22.

The front edge 21 is located in a circumferential marker on the side of the disc where the disc emerges from the interface with the pad (side FW).

Figure 1:
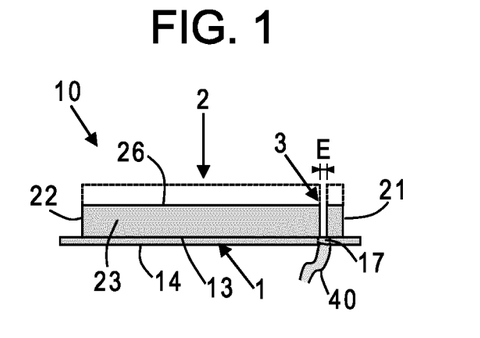
FIGS. 1 and 2 are general views, respectively profile and perspective views, of a brake pad according to a first embodiment of the invention.

The rubbing face is identified 26, it becomes progressively closer to the shoe as wear and tear of the lining 2 occurs in the direction of the shoe 1. In FIG. 1, the volume of the lining when new is represented as a dotted line, and as a continuous line, the volume after certain wear and tear. The thickness of the lining consequently decreases over time.

The lining is provided with a collection groove 3, open on the friction face 26 and arranged close to the front edge 21. The depth of the groove 3 corresponds the whole height of the groove, in other words, that the bottom of the groove corresponds to the internal surface area 13 of the shoe.

Advantageously, according to this invention, an airflow FA is created in this collection groove 3, this airflow being generated by suction coming from a vacuum source.

An optimal compromise between the suction power and the airflow generated has been observed, when the collection groove emerges at one of the edges chosen among the internal and external edges; in other words, the groove 3 emerges at only one of the lateral edges.

Figure 2:
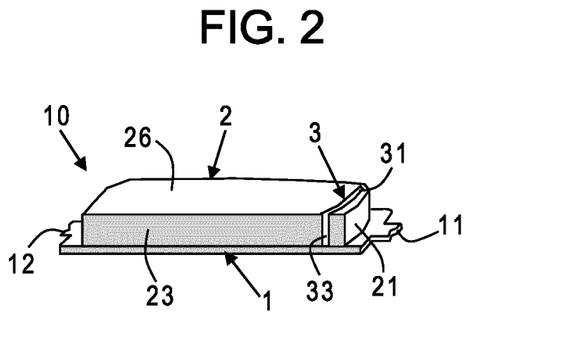
Figure 3:
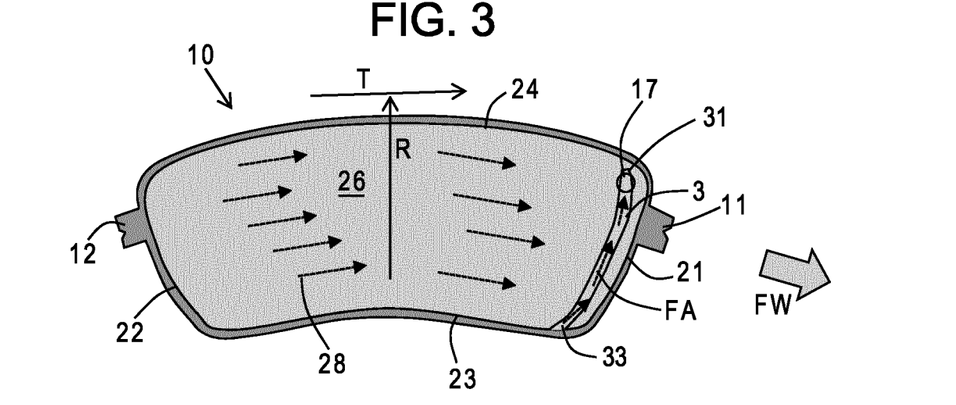
FIG. 3 is a front view of the brake pad in FIGS. 1 and 2.
Figure 4:
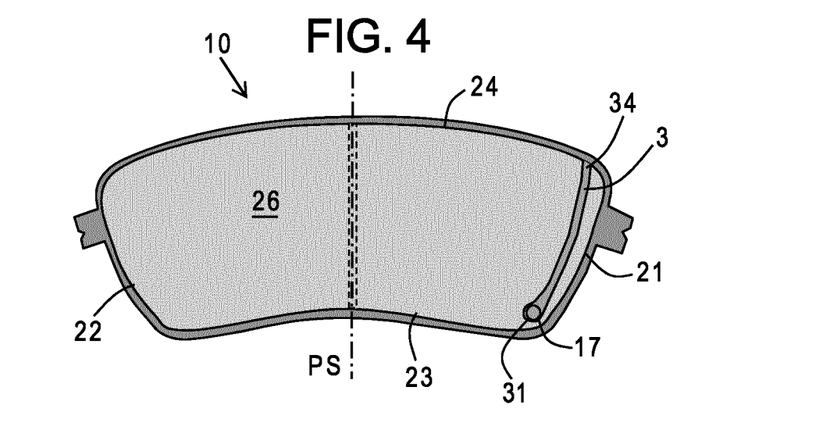
FIG. 4 is a front view of a brake pad according to a second embodiment.

For example, in FIGS. 1 to 3, the groove 3 emerges at the internal edge in an identified mouth 33. Conversely, in the variant represented in FIG. 4, the groove emerges at the external edge in an identified mouth 34.

Opposite the mouth on one of the external or internal edges, the groove 3 ends by an identified blind end 31, not emerging at the edge.

According to another embodiment not represented in the figures, the collection groove can emerge both to the internal edge 23 and to the external edge 24.

According to preferred aspects, the collection groove is unique and continuous, the collection groove is of a constant width and is substantially parallel to the front edge 21. However, it is not excluded, that the lining comprises other grooves for the purpose of releasing water.

For automotive vehicle-type pads, the width E of the collection groove that is between 1.5 mm and 4 mm can be chosen, preferably near 2.5 mm.

For heavy goods vehicle, bus, train, tram, and underground train-type pads, a width E of the collection groove which can go from 2.5 mm up to 6 mm can be chosen. Advantageously, the groove width can be chosen, substantially proportionally to the total surface area of the lining.

The collection groove 3 can be formed at the same time as the formation of the lining, or subsequently.

In the example illustrated, the shoe 1 comprises two tenons or ears 11, 12 which serve to hold and guide the brake pad. Each tenon is received by complementarity of form, in a housing of the calliper support 6. Thus, the vehicle stops according to the tangential T and radial R directions, and the housing enables a movement of the tenon according to the axial direction A.

The shoe comprises a hole 17 which is used as a passage for the suction of particles removed at the lining. Indeed, the shoe hole 17 emerges at the groove close to the blind end 31, which again optimises the airflow to collect particles.

However, generally, it is noted that the hole 17 in the shoe is positioned so that it is located in fluid communication with the collection groove, not necessarily close to the blind end 31.

Concerned about symmetry, it can be provided that the shoe comprises two holes, only one of which opposite the groove. In this case, there is only one single shoe reference, even if there are two separate pad references (see below).

The hole 17 can have a diameter that is slightly more than the general width of the groove; however, the groove can have a larger width where the hole 17 is.

As illustrated in the figures, and in common with the different possible embodiment variants, the disc is of a constant thickness, interdependent of the wheel to brake (or the wheel axles to brake); the two runners 10A, 10B (also called 'brake pads') are intended to support the disc to brake it, using the action of the brake calliper 5.

The disc comprises a hub, a first annular lateral face, on the side of the calliper's piston, noted 9A perpendicular to the axle A, and a second annular face on the side of the wheel rim, noted 9B parallel to the first lateral face; the radially external edges of the lateral faces are connected by an edge called a disc edge 93.

The brake calliper 5 is attached by attaching to the calliper support 6. In the example illustrated, this attachment is of the floating type according to A2, for example, with rods 56 (also called 'columns'), well known and therefore not detailed.

The calliper support 6 comprises a tread intended to be attached to a suspending arm or a hub carrier, and attached U-shaped hinge-plates on the disc: more specifically, a first hinge-plate 61 on the front side, a second hinge-plate 62 on the rear side, and a connecting arc 63 which connects the hinge-plates opposite the tread.

For the case of a road vehicle, the tread is arranged on the internal side of the vehicle in relation to the disc 9, and the connecting arc is arranged on the external side of the vehicle in relation to the disc 9. The tread is attached to the suspending arm or to the hub carried, as the case may be.

The runners 10A, 10B are attached so that they can be moved according to A in relation to the calliper support 6, but they are substantially immobilised in the circumferential direction T and in the radial direction R to the tenons 11, 12 and complementarities of forms already mentioned.

The pad on the piston side, in other words, opposite the wheel rim, is identified 10A, also the "bottom pad" is spoken of, it supports the first face 9A of the disc. The opposite identified pad 10B, known as "external", is on the side of the wheel rim, in other words, on the opposite side of the calliper's piston, it supports the second face 9B of the disc.

In the example illustrated, the bottom pad 10A and the external pad 10B are different, because of the different configuration of their linings, but it is not excluded that for standardisation reasons, two symmetrical grooves are formed in relation to the median plane of the pad PS.

In other configurations, there are other reasons which require that the bottom pad is different from the external pad.

The two pads are selectively requested, one in the direction of the other, to sandwich the disc 9 under the effect of the piston 55, by thus producing a force PF directed according to A2 parallel to the axial wheel direction A. The calliper has a general U-shape attached to the disc and comprises a body 50 and fingers 51, 52 arranged opposite the piston 55.

Figure 5:
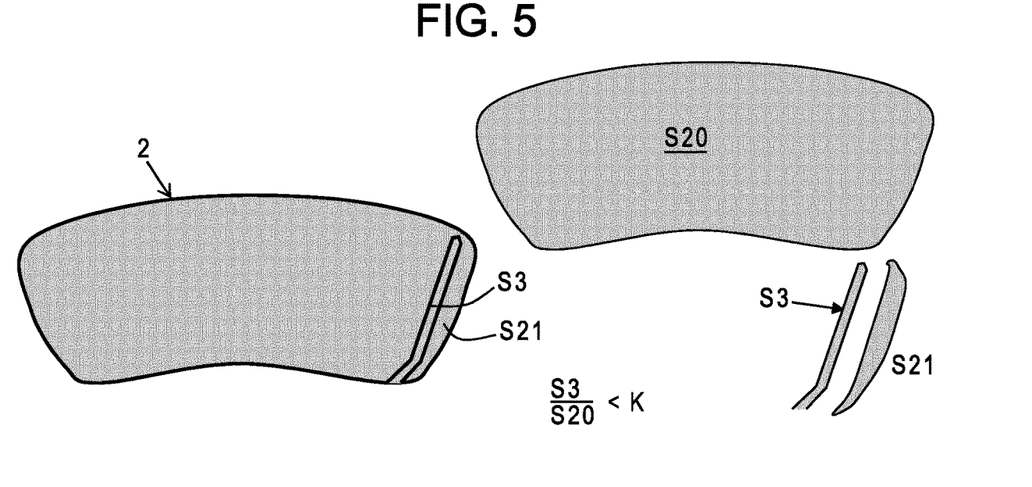
FIG. 5 illustrates the relationship of the areas and the surface area as a front view.

As regards the areas and surface areas necessary for the braking to be effective, in reference to FIG. 5, it is noted that the surface area S3 occupied by the groove, is very small compared with the total available surface area S20 on the friction face.

The ratio $K=S3/S20$ is defined.

The ratio $K<5\%$ can be advantageously had, or even preferably less than 4%.

The remaining surface area S21 located below the collection groove represents less than 10% of S20.

It is noted that the remaining surface area 21 which forms the edge below the groove 3 must be too small to avoid risks of mechanical damage of this edge.

The suction device can be arranged in several ways.

Figure 6:
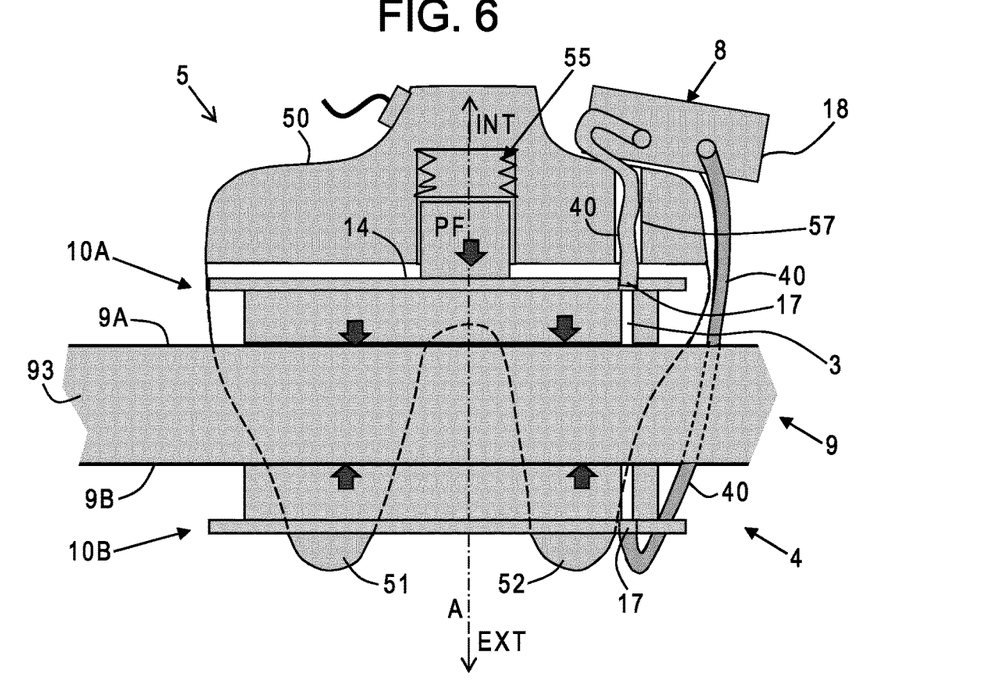
FIG. 6 is a view of a braking body seen from the axle, the calliper support not being represented.
Figure 7:
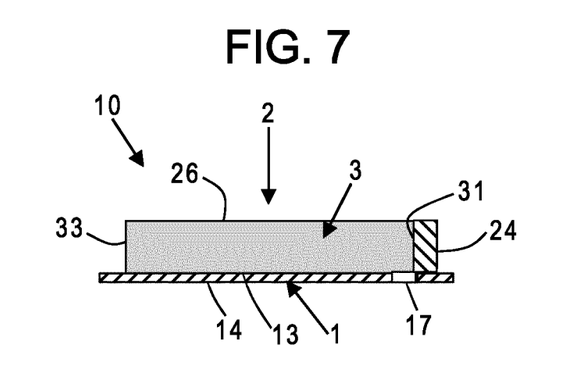
FIG. 7 is a cross-section view of the pad taken along the collection groove.
Figure 8:
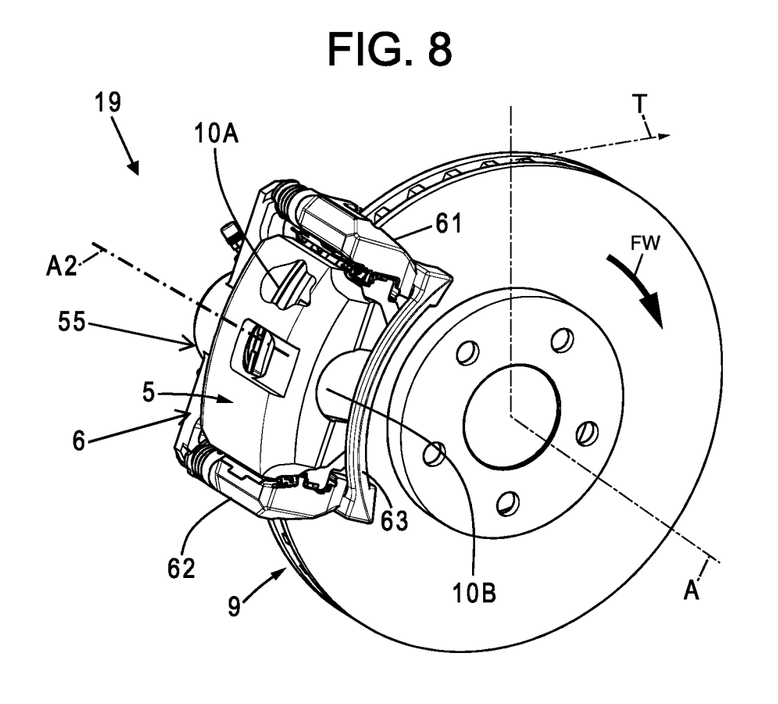
FIG. 8 illustrates, in perspective, a braking body, with its calliper support, its calliper, and the disc.

In FIG. 6, there is a local suction device 8 specific to a braking body; this suction device comprises an electric motor, a filter, a turbine. In this configuration, the length of the pneumatic ducts is short, as short as possible to limit the loss of aeraulic loads.

Regarding the hose which crosses the calliper.

Figure 12:
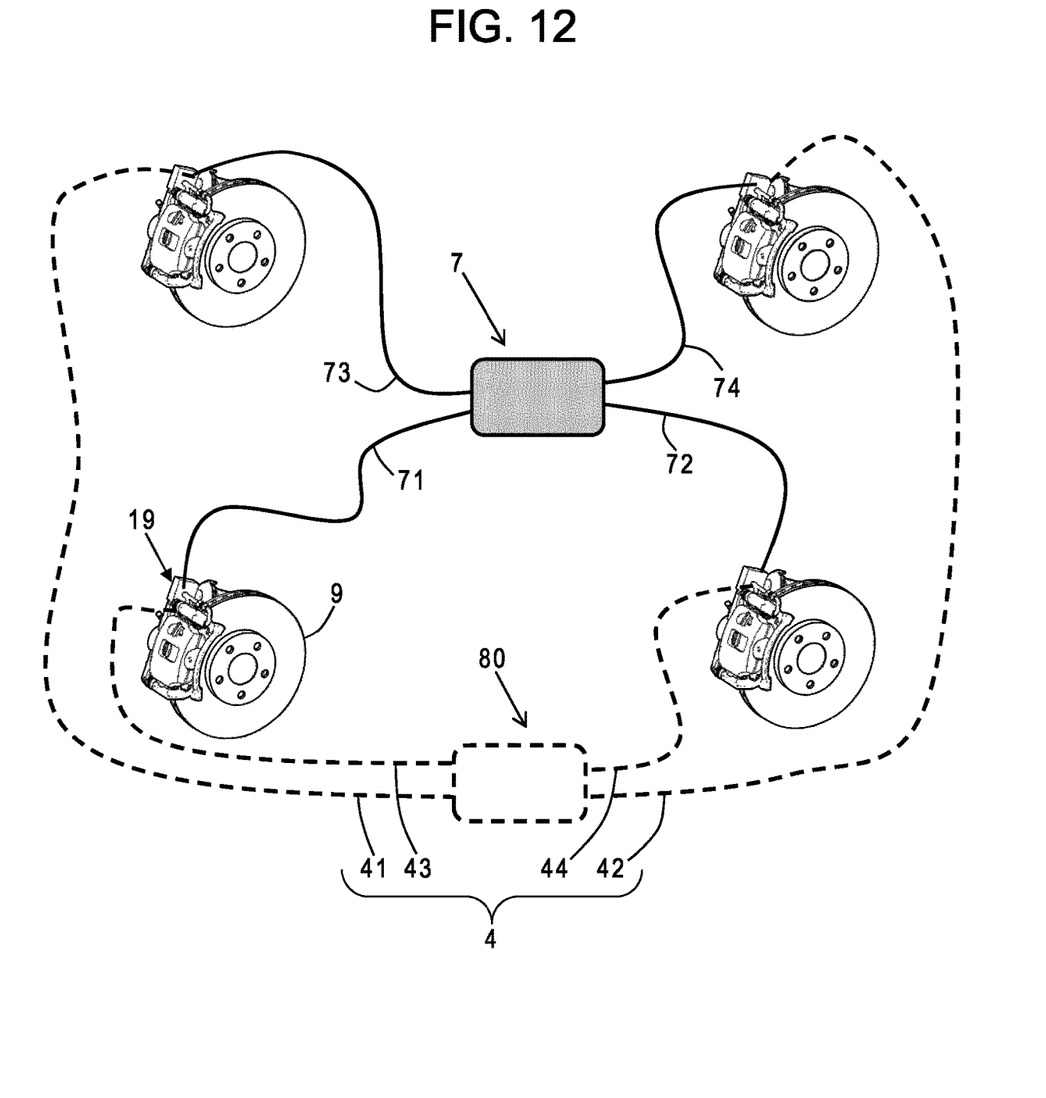

According to a variant, this suction device 8 can be arranged centrally, as this is illustrated as a dotted line in FIG. 12.

Fluid communication means are provided (noted generically by the reference 4), in other words, for example, a pneumatic hose otherwise called pneumatic channeling, which fluidly connects the suction device with the two collection grooves.

In practice, as can be seen in FIGS. 1 and 6, the communication means are formed by a flexible hose 40 of which one end is attached in the shoe hole 17 and the other end comes into the suction device.

The flexible hose in question can be formed from one single part or several parts, in other words, with sections of hose, possibly with connectors.

Figure 10:
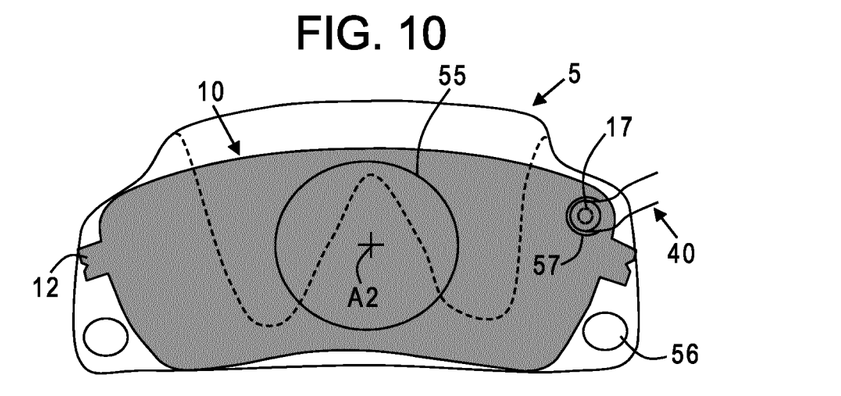
FIGS. 10 and 11 are front views of variants of brake units, FIG. 12 schematically illustrates an example of a complete system equipping an automotive vehicle.

On the internal side, according to the spatial configuration of the calliper, it can be necessary to resort to a trick, according to which the hose 40 passes through an internal passage 57 arranged in the body of the calliper, as illustrated in FIG. 10.

Figure 11:
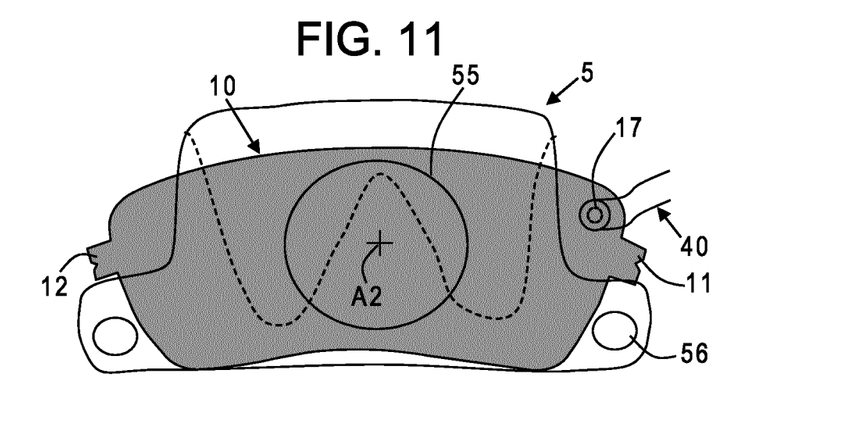

In FIG. 11, the flexible hose 40 comes to abut directly on the shoe of the pad, without the need to cross the body of the calliper.

This, on the internal side of the pad 10A, according to the structure of the calliper 5, the configuration in FIG. 10 can be called upon, with a crossing passage 57, or the configuration in FIG. 11 without a crossing passage in the calliper.

Figure 9:
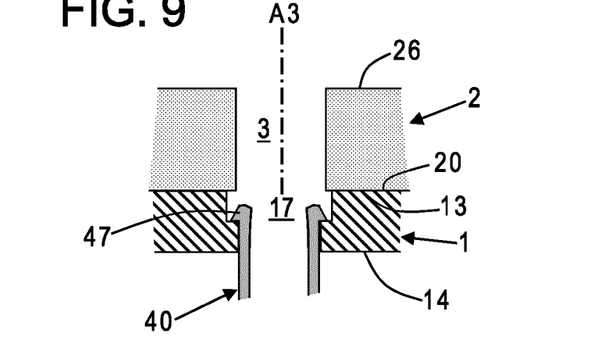
FIG. 9 illustrates the connection of a collection hose in the pad shoe hole.

FIG. 9 illustrates a solution for the attachment of the end of the flexible hose 40 in the shoe of the pad at the level of the hole 17. The hole 17 can be formed by two coaxial axle bores A3, this directed towards the lining being of a slightly larger diameter.

The free end of the hose comprises flexible hook shapes 47 provided to cooperate with a shoulder formed where the two bores of different diameters to the hole 17 meet.

Of course, other methods for attaching the end of the hose in the pad shoe can be considered, bonding, attachment by screwing, by magnetic components, etc.

As already stated, it is noted that there can be two symmetrical grooves in relation to the median plane of the pad PS, only one actually being used for the suction method.

The communication means 4 are formed by ducts or pneumatic channels of a small diameter.

In the version with the suction device and centralised collection (see FIG. 12), there is a centralised suction device 80 with a filter, turbine and electric motor, as well as pneumatic channels 41, 42, 43, 44, which respectively connect each one of the braking bodies to the central suction device.

In FIG. 12, an electronic control unit 7 is represented, responsible for controlling the suction phases according to a predefined logic, in particular according to the different braking phases. Suction can thus be avoided, when no braking action is exercised by the driver and/or by the vehicle system.

In a variant, the electronic control unit 7 can be connected by cables 71, 72, 73, 74 to the decentralised suction devices, located near the braking bodies.

Figure 13:
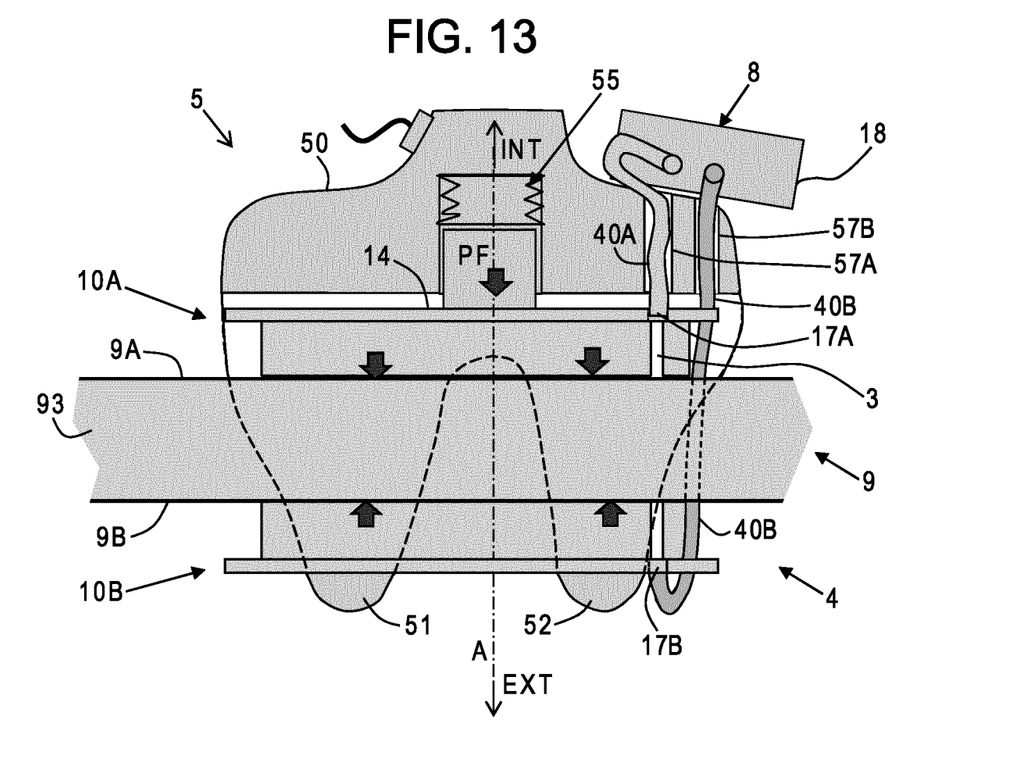
FIG. 13 represents, according to a similar view to that in FIG. 6, a variant of the first embodiment, and FIG. 14 schematically illustrates a pneumatic connection between two braking particle collection hoses and a suction device.

In FIG. 13, another variant of the invention has also been represented. Only the differences with the first embodiment and, in particular, the configuration in FIG. 6 will be explained.

According to the reference 40A, a first flexible hose, of which one end is attached in a first hole 17A of the bottom pad 10A has been identified. Likewise, according to the reference 40B, a second flexible hose, of which one end is attached in a second hole 17B of the external pad 10B has been identified.

As illustrated in FIG. 6, the first hose 40A passes through a first internal passage 57A arranged in the body of the calliper 5. According to this variant, the second hose 40B also passes through a second internal passage 57B arranged in the body of the calliper 5. This arrangement decreases the volume connected to the presence of the second hose 40B. The first 57A and second 57B passages are, of course, transversal.

Thus, a brake unit is provided, according to the invention, comprising the brake disc 9, the brake calliper 5, two pads 10A, 10B and the suction device 8 connected to the grooves of the pads by the communication means 4. The pad 10A comprises a first hole 17A. The pad 10B comprises a second hole 17B.

The communication means 4 comprise the first flexible hose 40A of which the end is fitted into the first hole 17A of the pad 10A. The communication means 4 also comprise the second flexible hose 40B of which the end is fitted into the second hole 17B of the pad 10B.

Furthermore, the first hose 40A is arranged in the first passage 57A of the calliper 5. The second hose 40B is arranged in the second passage 57B of the calliper 5. It will also be noted that the first 57A and second 57B passages can be separate, as in the configuration illustrated in FIG. 13, but also only forming one single passage which receives the first 40A and second 40B flexible hoses. The second hose 40B can also be arranged in a collecting passage made on the disc 9.

It will also be noted that at least one among the first 57A and second 57B passages of the calliper cannot comprise a flexible hose. Thus, the dust particles are sucked into these passages 57A and 57B without gaining any flexible hose. Furthermore, the second flexible hose 40B can be partially arranged in the collection groove 3B of the pad 10B.

Figure 14:
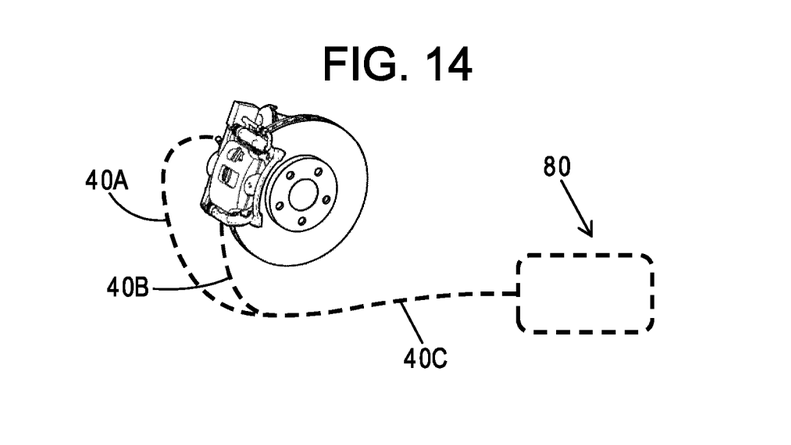

Furthermore, according to an advantageous configuration illustrated in FIG. 14, the first 40A and second 40B flexible hoses can be joined by their opposite ends to those respectively fitted into the first 17A and second 17B holes. They thus comprise a shared arm 40C which emerges at the suction device 80A. The unit formed by the first 17A and second 17B flexible hoses, as well as the shared arm 40C thus has a general "Y"-shape. Again, this configuration has the advantage of limiting the volume of the braking unit according to the invention. Furthermore, it will be noted that the configuration in FIG. 14 can also be positioned with two hoses 40 according to the configuration in FIG. 6.

The invention claimed is:

1. A brake pad in an axle disc brake, comprising:
a shoe (1); and
a lining made from friction material,
the lining being delimited by a friction face (26), a mounting face (20), an internal edge (23), an external edge (24), a front edge (21), a rear edge (22),
the lining being provided with a collection groove (3), open on the friction face (26) and arranged close to the front edge (21), and
the shoe comprising a hole (17) in fluid communication with the collection groove, the hole being connected to a vacuum source via communication means (4),
wherein the collection groove emerges at only one of either the internal edge or the external edge.

2. The brake pad according to claim 1, wherein the collection groove is hollowed directly in the friction material, up to a surface area of the shoe.

3. The brake pad according to claim 1, wherein the collection groove is formed directly in the friction material during a sintering operation, with a groove bottom that corresponds to a surface area of the shoe.

4. The brake pad according to claim 1, wherein a surface area occupied by the collection groove is less than 5% of a total available surface area on the friction face.

5. The brake pad according to claim 1, wherein the collection groove extends generally radially in relation to the axle between an open end (33) and a blind end, the shoe hole emerging at the collection groove close to the blind end (31), the hole (17) of the shoe emerging at the collection groove close to the blind end.

6. The brake pad according to claim 1, wherein the collection groove is unique and continuous, and the collection groove is of a constant width and is substantially parallel to the front edge of the lining.

7. A braking unit comprising a brake disc (9), a brake calliper (5), two brake pads (10A,10B) according to claim 1, and a suction device (8) pneumatically connected to the collection grooves of the brake pads by the communication means (4).

8. The braking unit according to claim 7, wherein the communication means comprise at least one flexible hose (40).

9. The braking unit according to claim 8, wherein an end of the flexible hose is fitted into a shoe hole (17).

10. The braking unit according to claim 7, wherein the communication means are formed through an internal passage (57) arranged in a body (50) of the calliper (5).

11. The brake pad according to claim 2, wherein a surface area occupied by the collection groove is less than 5% of a total available surface area on the friction face.

12. The brake pad according to claim 3, wherein a surface area occupied by the collection groove is less than 5% of a total available surface area on the friction face.

13. The brake pad according to claim 2, wherein the collection groove extends generally radially in relation to the axle between an open end (33) and a blind end, the shoe hole emerging at the collection groove close to the blind end (31), the hole (17) of the shoe emerging at the collection groove close to the blind end.

14. The brake pad according to claim 3, wherein the collection groove extends generally radially in relation to the axle between an open end (33) and a blind end, the shoe hole emerging at the collection groove close to the blind end (31), the hole (17) of the shoe emerging at the collection groove close to the blind end.

15. The brake pad according to claim 4, wherein the collection groove extends generally radially in relation to the axle between an open end (33) and a blind end, the shoe hole emerging at the collection groove close to the blind end (31), the hole (17) of the shoe emerging at the collection groove close to the blind end.

16. The brake pad according to claim 2, wherein the collection groove is unique and continuous, and the collection groove is of a constant width and is substantially parallel to the front edge of the lining.

17. The brake pad according to claim 3, wherein the collection groove is unique and continuous, and the collection groove is of a constant width and is substantially parallel to the front edge of the lining.

18. The brake pad according to claim 4, wherein the collection groove is unique and continuous, and the collection groove is of a constant width and is substantially parallel to the front edge of the lining.

19. The brake pad according to claim 5, wherein the collection groove is unique and continuous, and the collection groove is of a constant width and is substantially parallel to the front edge of the lining.

20. A braking unit comprising a brake disc, a brake calliper, two brake pads according to claim 2, and a suction device pneumatically connected to the collection grooves of the brake pads by the communication means.

* * * * *